(12) United States Patent
Nakano et al.

(10) Patent No.: US 6,336,539 B1
(45) Date of Patent: Jan. 8, 2002

(54) DRAIN MECHANISM FOR HYDRAULIC POWER TRANSMISSION JOINT

(75) Inventors: Hiroyuki Nakano; Kazuhisa Shimada; Tadahiko Kato, all of Shizuoka; Toshiharu Takasaki, Kanagawa; Hirotaka Kusukawa, Machida; Shigeo Murata, Kanagawa, all of (JP)

(73) Assignees: Fujiunivance Co., Shizuoka; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/571,357

(22) Filed: May 15, 2000

(30) Foreign Application Priority Data

May 17, 1999 (JP) ............................. 11-135450

(51) Int. Cl.[7] ............................................. F16D 31/02
(52) U.S. Cl. ...................... 192/59; 192/103 F; 192/82 T
(58) Field of Search ......................... 192/59, 60, 103 F, 192/82 T (56) References Cited

U.S. PATENT DOCUMENTS

| 4,456,110 A | 6/1984 | Hanks et al. ............. 192/82 T |
| 5,037,353 A | 8/1991 | Suzuki et al. ................ 464/27 |
| 5,103,642 A | 4/1992 | Suzuki et al. ............. 192/59 X |
| 5,595,214 A | 1/1997 | Shaffer et al. |
| 5,706,658 A | 1/1998 | Kato et al. |

FOREIGN PATENT DOCUMENTS

| EP | 1054176 A2 | 11/2000 |
| EP | 1055836 A2 | 11/2000 |
| JP | 483920 | 3/1992 |
| JP | 2000310246 A | 11/2000 |
| JP | 2000337402 A | 12/2000 |

Primary Examiner—Richard M. Lorence
Assistant Examiner—Saúl Rodriguez
(74) Attorney, Agent, or Firm—Wenderoth, Lind & Ponack, L.L.P.

(57) ABSTRACT

A drain plug is disposed in a drain hole through which oil is discharged from a high-pressure chamber formed in a valve block. Within the drain plug there is arranged a drain pin that slidably opens and closes the drain hole. A fixed pin serves to restrict a displacement of the drain pin. A thermo-switch is located within a low-pressure chamber behind the drain pin in such a manner as to be urged by a return spring so that the drain pin is pressed to keep the drain hole closed. When a predetermined temperature is reached, the thermo-switch allows its head pin to extend, with the reaction force as a result of abutment of the head pin against the fixed pin causing the thermo-switch to retreat to release the pressing force exerted on the drain pin. In consequence, the drain pin is displaced by a high pressure toward the direction in which the drain hole is opened, allowing high-pressure oil to be drained into the low pressure side.

3 Claims, 6 Drawing Sheets

DRAIN MECHANISM FOR HYDRAULIC POWER TRANSMISSION JOINT

BACKGROUND OF THE INVENTION

1. Field of the Invention

The present invention relates generally to a drain mechanism for a hydraulic power transmission joint for use in 4 wheel-drive mechanisms for motor vehicles, and more particularly to a drain mechanism for a hydraulic power transmission joint for switching from 4 wheel-drive to 2 wheel-drive depending on a rise in temperature.

2. Description of the Related Arts

Such a hydraulic power transmission joint for use in an automobile 4 wheel-drive mechanism is hitherto known from U.S. Pat. Nos. 5,706,658 and 5,983,635.

Figure 1:
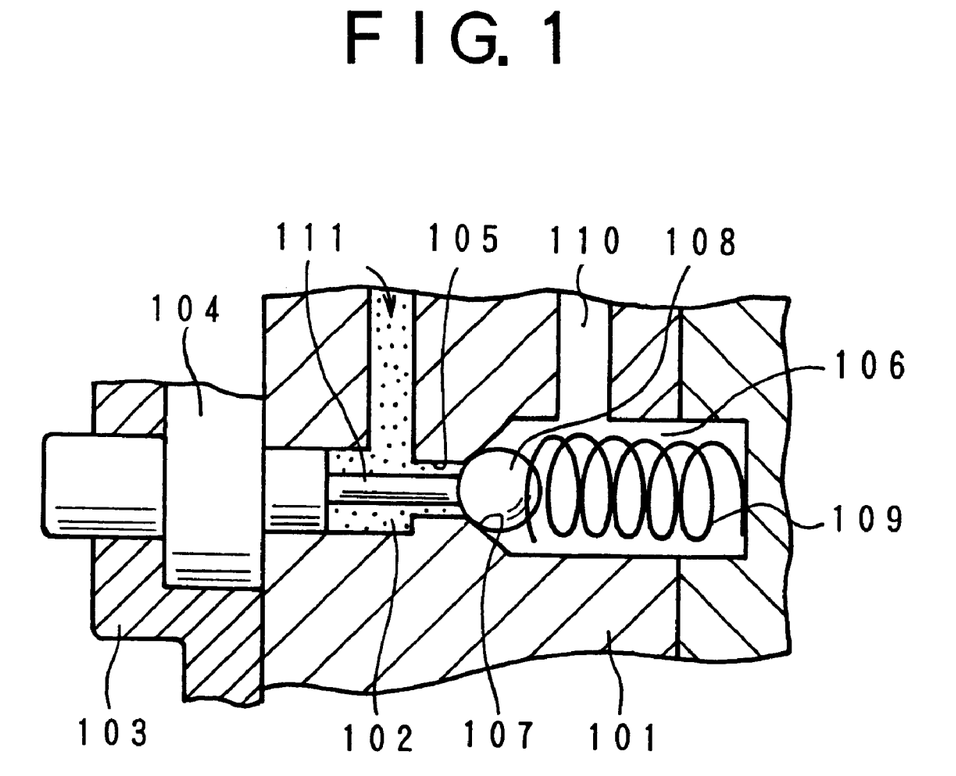
FIG. 1 is a sectional view of a drain mechanism being currently developed by the present inventors.
Figure 2:
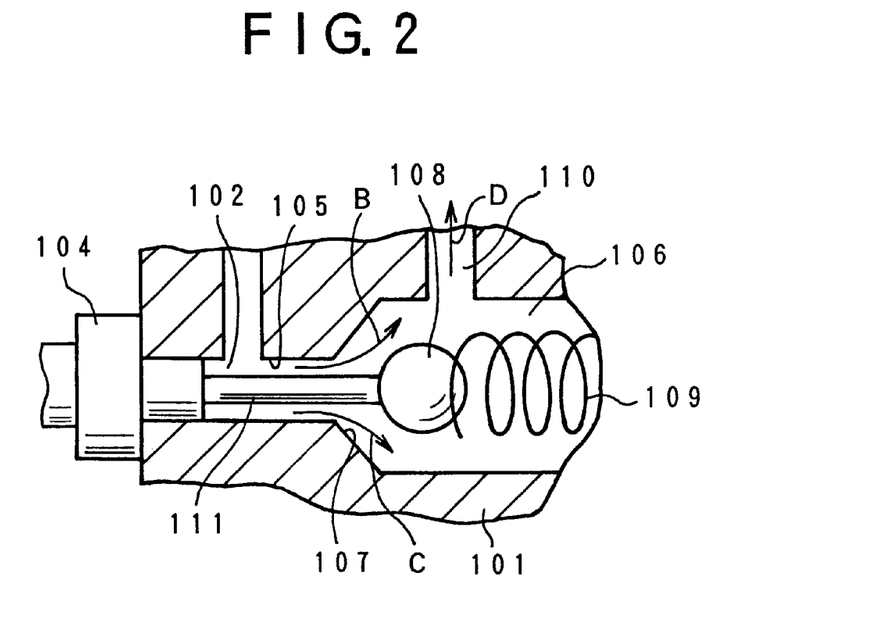
FIG. 2 is a sectional view of the drain mechanism of FIG. 1 in a state when a predetermined temperature has been reached.
Figure 3:
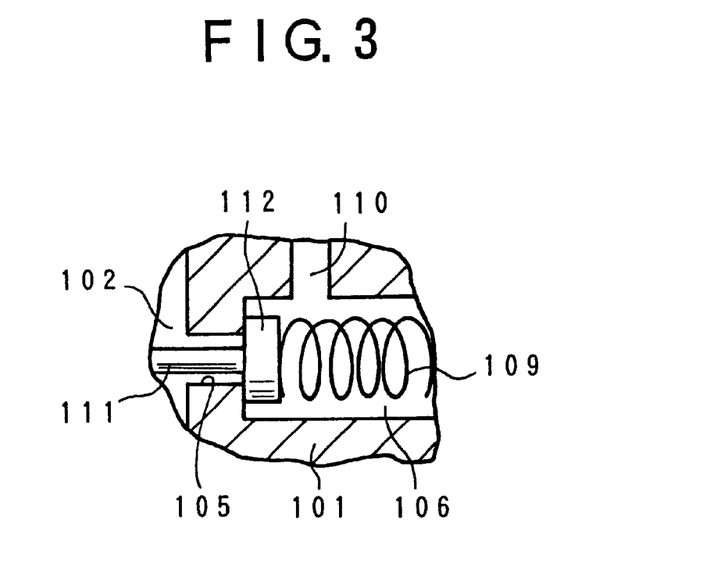
FIG. 3 is a sectional view of another drain mechanism being currently developed by the present inventors.

FIGS. 1 to 3 illustrate an exemplary drain mechanism for a hydraulic power transmission joint being currently developed by the present inventors on the basis of such United States Patents. This drain mechanism serves to perform a drainage from a high-pressure chamber to a low-pressure chamber when the temperature of oil has reached a predetermined level, to substantially nullify the transmission torque for the switching to 2 wheel-drive.

Referring to FIG. 1, a valve block 101 is coupled to a rotor (not shown), for integral rotation with the rotor. The rotor is spline coupled to a main shaft directly connecting with rear wheels, for integral rotation with the main shaft. The valve block 101 is formed with a high-pressure chamber 102 that communicates with a discharge hole formed in the rotor. The valve block 101 is formed with an orifice (not shown) that leads to the high-pressure chamber 102. A thermo-switch 104 is screwed by a securing member to the end face of the valve block 101 in such a manner that the thermo-switch 104 is inserted into the high-pressure chamber 102. The valve block 101 is provided with a drain hole 105 that opens to the high-pressure chamber 102. The valve block 101 is further provided with an accommodation hole 106 that communicates via the drain hole 105 to the high-pressure chamber 102. A check ball 108 for blocking the drain hole 105 is seated on a valve seat 107 formed in the accommodation hole 106. The check ball 108 is urged by a return spring 109. The valve block 101 is formed with a drain passage 110 that leads to the accommodation hole 106. The thermo-switch 104 has a head pin 111 adapted to be inserted into the drain hole 105 so as to press the check ball to open the drain hole 105. The thermo-switch 104, when a predetermined temperature is reached, causes the head pin 111 to extend to press the check ball 108 to open the drain hole 105, as shown in FIG. 2, allowing oil to be drained through the drain passage 110 into the low-pressure chamber to thereby substantially nullify the transmission torque for the switching to 2 wheel-drive. On the contrary, when the temperature at the thermo-switch 104 falls below the predetermined level, the check ball 108 is pushed back by the biasing force of the return spring 109, allowing the head pin 111 to return to its original position, to block the drain hole 105. The drainage of oil is thus ceased, allowing a return to 4 wheel-drive based on the torque transmission.

FIG. 3 depicts another drain mechanism. A valve body 112 is integrally formed with the fore-end of the head pin 111 of the thermo-switch fixedly secured to the valve block 101. The valve body is urged by the return spring 109 to block the drain hole 105. When a predetermined temperature is reached, the head pin 111 is extended rightward so that the valve body 112 is displaced rightward against the return spring 109, to thereby open the drain hole 105. Oil flows from the high-pressure chamber 102 through the drain hole 105 into the accommodation hole 106 that accommodates the return spring 109, after which it is drained through the drain passage 110 into the low-pressure chamber. When the temperature falls below the predetermined level, the return spring 109 biases the valve body 112 to block the drain hole, thus ceasing the drainage of oil.

However, such a drain mechanism for the hydraulic power transmission joint may often suffer from a problem that the thermo-switch tends to have a low strength-related durability since it is housed in the high-pressure chamber. Furthermore, due to the structure in which the check ball is thrust by the head pin of the thermo-switch, the diameter of the drain hole needs to be increased in order to allow for the passage of the head pin therethrough, thus subjecting the check ball to a larger load. If the check ball has a large pressure receiving area, it may be possible to deal with the high pressure by adding to the biasing force of the return spring, although another problem still remains that it may be difficult to raise the pressure to a higher level since the biasing force acquired by the return spring is limitative. Moreover, there was a need for elements for fixing the thermo-switch to the valve block, resulting in an enlarged scale of the drain mechanism.

SUMMARY OF THE INVENTION

The present invention provides a drain mechanism for a hydraulic power transmission joint ensuring an improved strength and durability of a thermo-switch and achieving a high-pressure setting by a return spring, as well as a reduction in size.

According to an aspect of the present invention there is provided a drain mechanism for a hydraulic power transmission joint adapted to be interposed between an input shaft and an output shaft that are rotatable relative to each other, to transmit torque as a function of the rotational-speed difference between the input and output shafts, the drain mechanism comprising a drain plug accommodated within a valve block and having a drain hole through which oil is introduced from a high-pressure chamber; a thermo-switch located within a low-pressure chamber in the valve block in such a manner as to be urged by a return spring, the thermo-switch having a head pin that protrudes when a predetermined temperature is reached; a fixed pin fixedly inserted into the valve block, the fixed pin being positioned so as to allow a head pin of the thermo-switch urged by the return spring to abut thereagainst, the fixed pin when the head pin protrudes at the predetermined temperature causing the thermo-switch to retreat against the return spring; and a drain pin slidably located within the drain plug, the drain pin being pressed by the thermo-switch to close the drain hole for the duration in which the predetermined temperature is not reached, the drain pin when the predetermined temperature is reached, opening the drain hole as a result of cutoff of the pressing force caused by a retreat of the thermo-switch. In this manner, the present invention allows the thermo-switch to be displaceably arranged in the low-pressure chamber, so that no high pressure acts on the thermo-switch, which contributes to an improvement in the strength and durability. Furthermore, there is no need to insert the head pin of the thermo-switch into the drain hole, with the result that the diameter of the drain hole can be reduced, enabling the hydraulic pressure at the high pressure side to be set at a higher level. In addition, there is no need for specific members for fixing the thermo-switch, making it possible to achieve a miniaturization while keeping the same performance.

Herein, the drain pin may have a recessed portion which is formed at its rear end side and which is open rearward, the recessed portion receiving the fixed pin that extends therethrough, with the head pin of the thermo-switch being inserted into the recessed portion so as to allow the head pin to abut against the fixed pin. This contributes to a secure restriction of the displacement of the drain pin, as well as to a secure operation of the thermo-switch.

The hydraulic power transmission joint employing the drain mechanism of the present invention comprises a housing coupled to the input shaft and having a cam face formed on its inner side surface; a rotor coupled to the output shaft and being rotatably accommodated in the housing, the rotor having a plurality of axially extending plunger chambers; a plurality of plungers each being reciprocatively accommodated in each of the plurality of plunger chambers under a biasing force of the return spring, the plurality of plungers being operated by the cam face upon the relative rotations of the input and output shafts; and a discharge hole formed in the rotor and opening to the plurality of plunger chambers; wherein the valve block is coupled to the rotor so that oil discharged by the operation of the plungers induces a reaction force in the plungers due to a flow resistance upon the passage through an orifice provided in the valve block, to thereby transmit torque between the housing and the rotor.

The above and other objects, aspects, features and advantages of the present invention will become more apparent from the following detailed description when read in conjunction with the accompanying drawings.

DETAILED DESCRIPTION OF THE PREFERRED EMBODIMENT

Figure 4:
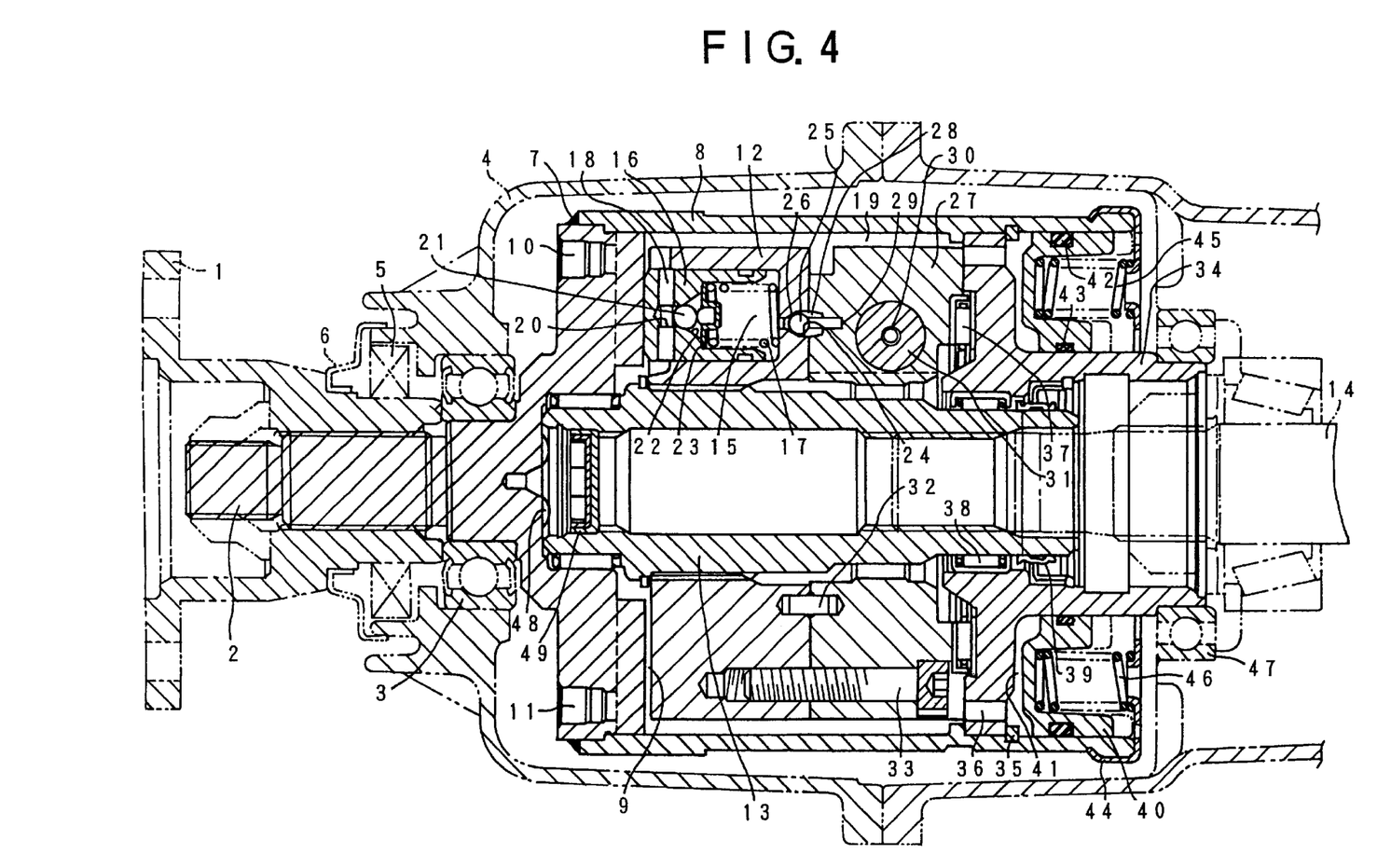
FIG. 4 is a sectional view of a hydraulic power transmission joint employing a drain mechanism in accordance with the present invention.

FIG. 4 is a sectional view of a hydraulic power transmission joint employing a drain mechanism in accordance with the present invention. A companion flange 1 is coupled to a propeller shaft (not shown) acting as a front wheel driving shaft. A cam housing shank 2 is inserted into the companion flange 1 for spline coupling. The cam housing shank 2 has on its outer periphery a front bearing 3 by way of which the cam housing shank 2 is supported on a differential gear case 4. Between the differential gear case 4 and the companion flange 1 there are provided a seal member 5 and a cover 6 that prevent in cooperation entrance of foreign particles and outflow of differential gear oil. A housing 8 is secured at a weld 7 to the right-hand end of the cam housing shank 2. On its inner side surface, the cam housing shank 2 is provided with a cam face 9 having two or more raised portions. Plugs 10 and 11 are inserted into the cam housing shank 2, for allowing oil to be injected into the interior of the joint or discharged therefrom. A rotor 12 is rotatably accommodated in the housing 8 and is engaged with a main shaft 13 for integral rotation therewith. A drive pinion gear 14 of a rear differential gear is fixedly inserted into the interior of the main shaft 13 from the right side so that the main shaft 13 rotates jointly with the drive pinion gear 14. The rotor 12 is formed with a plurality of axially extending plunger chambers 15, each of which houses a plunger 16 slidably by way of a return spring 17. An intake passage 18 is formed in the plunger 16 at its head side that communicates with a low-pressure chamber 19. The intake passage 18 opens to the plunger chamber 15 by way of a communication hole 20 that is opened or closed by a one-way intake valve 21 in the form of a ball. The interior of the plunger chamber 15 is formed with a valve seat 22 on which the one-way valve 21 is seated. A check plug 23 is disposed at the stepped portion of the valve seat 22. Between the check plug 23 and the one-way valve 21 there is interposed a check spring (not shown) that serves to urge the one-way valve 21 for positioning. The return spring 17 intervenes between the check plug 23 and the bottom of the rotor 12. A discharge hole 24 is formed in the rotor 12 so as to open to the plunger chamber 15. A one-way discharge valve 25 in the form of a ball is disposed in the discharge hole 24. The discharge hole 24 is formed with a valve seat 26 on which the one-way valve 25 is seated.

The rotor 12 is followed by a valve block 27 which is provided with a high-pressure chamber 28 that communicates with the discharge hole 24 of the rotor 12. A restriction member 29 projects into the high-pressure chamber 28 for positioning the one-way valve block 25 at a predetermined location. The valve block 27 is provided with an orifice member 31 having an orifice 30 that leads to the high-pressure chamber 28. The valve block 27 and the rotor 12 are positioned relative to each other by a pin 32 and are rigidly fastened together by a bolt 33. When the plunger 16 is in its intake stroke, the one-way intake valve 21 at the head of the plunger 16 is opened allowing oil to flow through the low-pressure chamber 19, intake passage 18 and the communication hole 20 into the plunger chamber 15. At that time, the one-way valve discharge 25 at the discharge hole 24 of the rotor 12 is closed blocking a back flow of oil from the high-pressure chamber 28. On the contrary, when the plunger 16 is in its discharge stroke, the one-way discharge valve 25 is opened allowing oil within the plunger chamber 15 to flow through the discharge hole 24 and high-pressure chamber 28 into the orifice 30. At that time, the one-way intake valve 21 is closed to prevent oil from leaking through the communication hole 20 and intake passage 18 into the low-pressure chamber 19.

The valve block 27 is followed by a bearing retainer 34. The bearing retainer 34 is rigidly press fitted into the housing 8 and is positioned by a snap ring 35. The bearing retainer 34 is formed with a through-hole 36 that communicates with the low-pressure chamber 19. Needle bearings 37 and 38 are interposed between the bearing retainer 34 and the valve block 27 and between the bearing retainer 34 and the main shaft 13, respectively. An oil seal 39 is also provided between the bearing retainer 34 and the main shaft 13 for the prevention of an outflow of oil. Outside the bearing retainer 34 there is slidably provided an accumulator piston 40 for absorbing oil thermal expansion and contraction, the accumulator piston 40 defining an accumulator chamber 41 that communicates with the low-pressure chamber 19 by way of the through-hole 36 in the bearing retainer 34. O-rings 42 and 43 are interposed between the accumulator piston 40 and the housing 8 and between the accumulator piston 40 and the bearing retainer 34, respectively. Return springs 45 and 46 are disposed between an accumulator retainer 44 and the bottom of the accumulator piston 40. The extended portion of the bearing retainer 34 has on its outer periphery a rear bearing 47 by way of which the bearing retainer 34 is supported by the differential gear case 4. A lubricant groove 48 and a seal member 49 are provided in the left-hand opening of the main shaft 13.

Figure 5A:
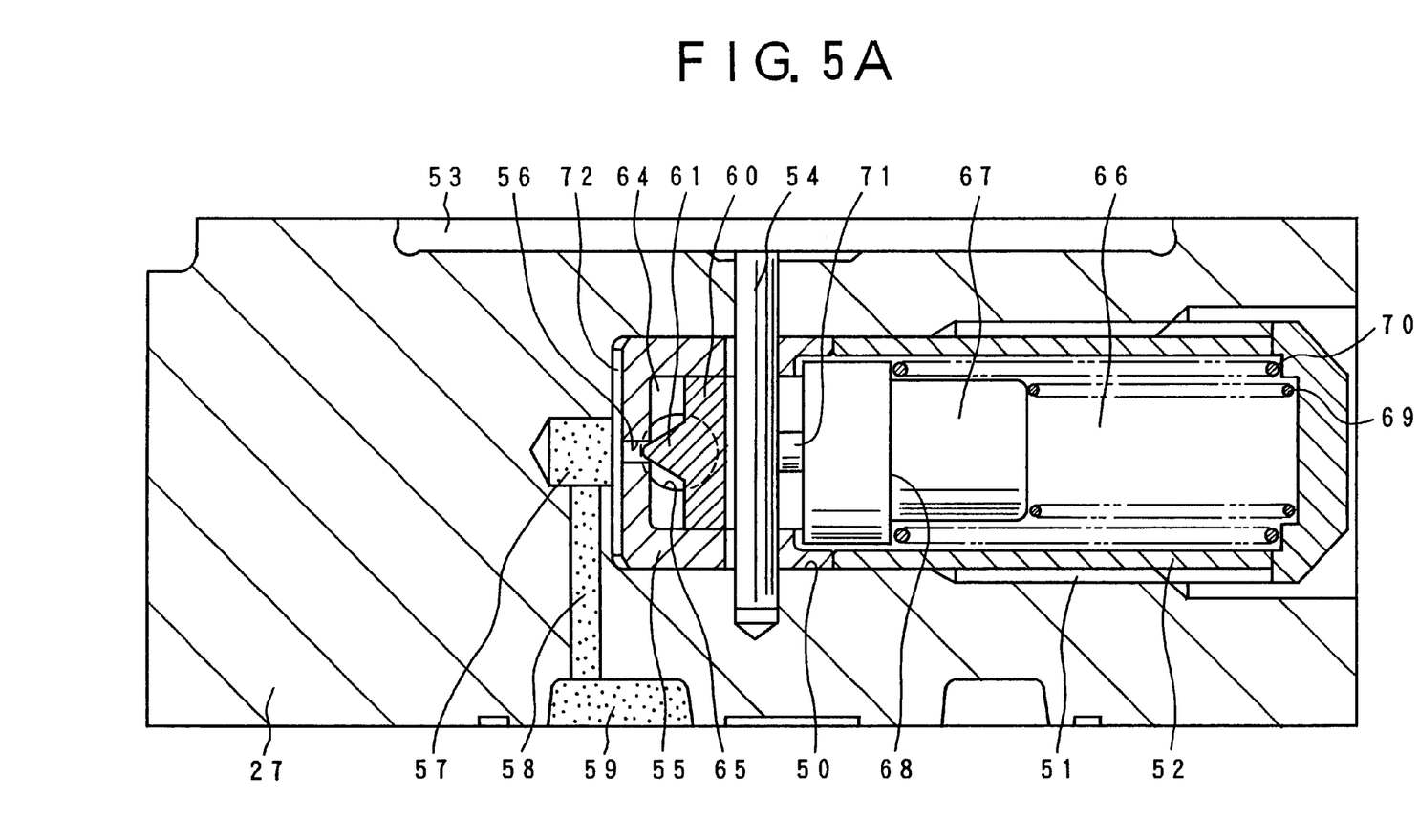
FIGS. 5A and 5B are sectional views of an embodiment of the drain mechanism in accordance with the present invention.
Figure 5B:
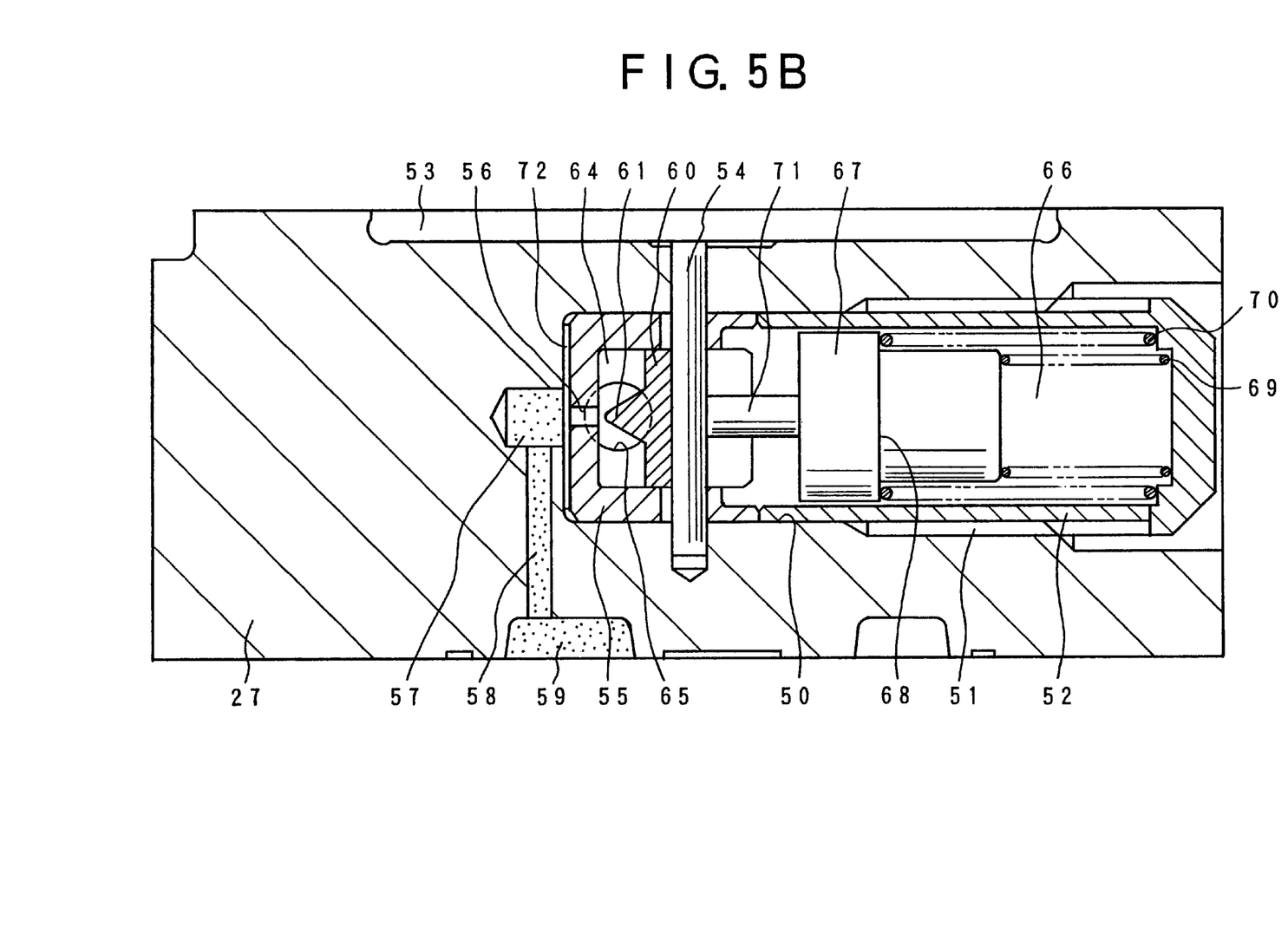

FIGS. 5A and 5B are sectional views of an embodiment of a drain mechanism in accordance with the present invention, with FIG. 5A depicting the pre-operation status, and FIG. 5B depicting the post-operation status. Referring to FIG. 5A, the valve block 27 is coupled to the rotor 12 and rotates jointly with the rotor 12. The valve block 27 includes an accommodation hole 50 that is formed with a threaded portion 51 for receiving a switch plug 52. The valve block 27 is formed with a bearing seat 53 for the needle bearing 37. A fixed pin 54 is inserted from the bearing seat 53 through the accommodation hole 50 and is retained rigidly by the needle bearing 37 for the prevention of dislocation. A metallic seal washer 72 is first placed on the bottom at the left-hand end of the accommodation hole 50 and then a drain plug 55 is inserted and is fixed by the switch plug 52. The drain plug 55 is of a substantially cup-shaped profile that opens rearward (rightward). The end face of the drain plug 55 is formed with a drain hole 56 that communicates with the high-pressure side. The valve block 27 is formed with a high-pressure port 57 which opens to the drain hole 56 and which leads through a high-pressure passage 58 to a high-pressure chamber 59. A drain pin 60 is received in the drain plug 55 so as to be able to open and close the drain hole 56, the drain pin 60 having at its fore-end a protrusion 61 for opening and closing the drain hole 56. The protrusion 61 is in the shape of a cone having a substantially triangular profile, with the tapered face of the protrusion 61 abutting against the opening end of the drain hole 56. The drain hole 56 can thus be blocked by the protrusion 61 even though the drain hole 56 has a smaller diameter. As shown in the transverse cross section of FIG. 6, the drain pin 60 is open at the end opposite the protrusion 61 and is provided with a recessed portion 63 that opens rearward (rightward). The fixed pin 54 is inserted through the recessed portion 63 of the drain pin 60 in such a manner that when the drain pin 60 is displaced to open the drain hole 56, the recessed portion 63 is brought into abutment against the fixed pin 54 so that the displacement of the drain pin 60 is restricted.

Referring again to FIG. 5A, a drain passage 65 is provided in a drain chamber 64 of the drain plug 55 within which the drain pin 60 is received, allowing oil to flow from the high-pressure port 57 through the drain hole 56 into the drain passage 65 prior to drainage into a low-pressure chamber. Within the switch plug 52 there is formed a low-pressure chamber 66 which displaceably accommodates a thermo-switch 67 that has a shoulder 68 formed on its outer periphery. A return spring 70 is interposed between the shoulder 68 and the switch plug 52, and a return spring 69 is interposed between the bottom of the thermo-switch 67 and the switch plug 52. The thermo-switch 67 is urged by the return springs 69 and 70 so as to press the drain pin 60 leftward to thereby block the drain hole 56. The thermo-switch 67 has a head pin 71 located centrally at its fore-end in such a manner that prior to the operation, a minute gap is formed between the head pin 71 and the fixed pin 54. Arrangement is such that when a predetermined temperature is reached, the head pin 71 is extended to abut against the fixed pin 54, with the resultant reaction force causing the thermo-switch 67 to retreat rightward against the return springs 69 and 70, whereupon a high-pressure from the high-pressure port 57 causes a rightward displacement of the drain pin 60 to open the drain hole 56. The thermo-switch 67 is accommodated in the low-pressure chamber 66 so as to press the drain pin 60 while being urged by the return springs 69 and 70, with no need for any members for fixing the thermo-switch 67.

Figure 6:
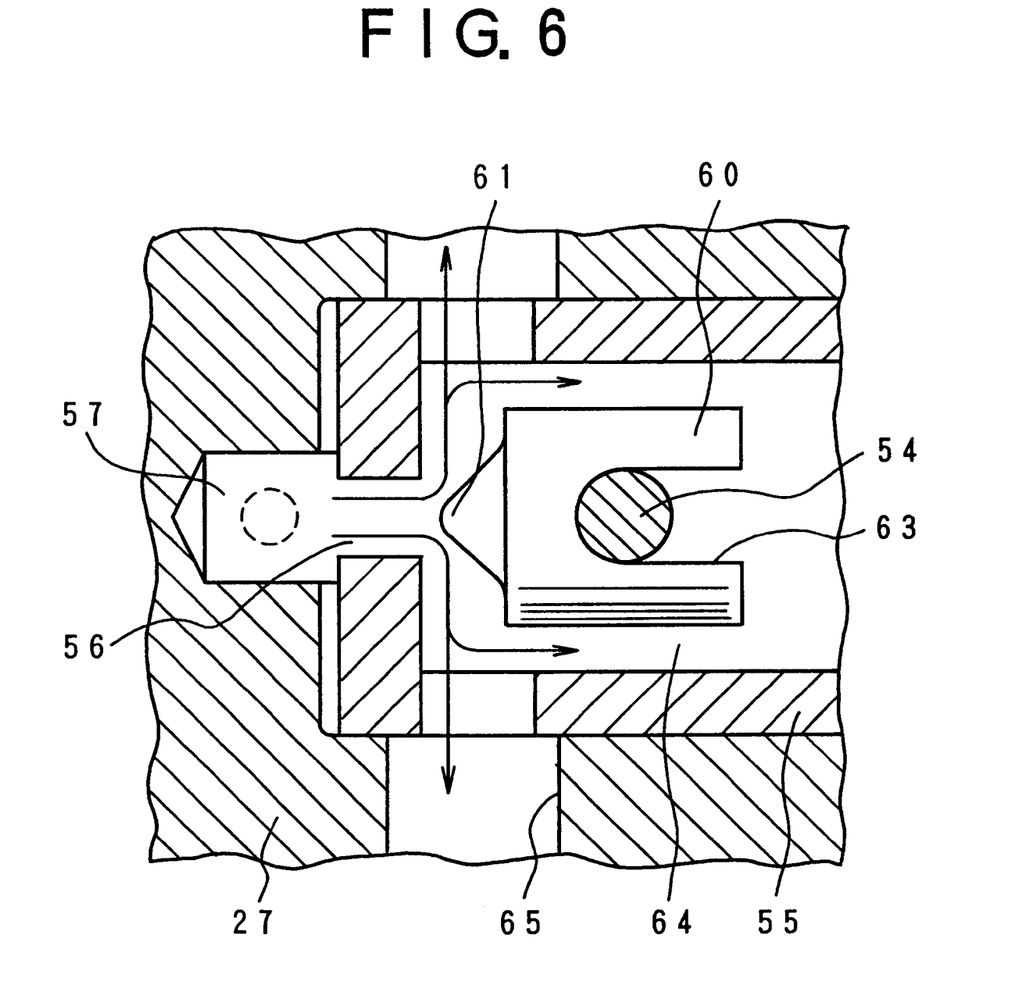
FIG. 6 is a transverse cross section of the region of a drain pin of FIG. 5B.

The operative functions will now be described. Prior to the operation, as seen in FIG. 5A, the drain pin 60 is urged leftward via the thermo-switch 67 by the return springs 69 and 70 so that its protrusion 61 blocks the drain hole 56. The head pin 71 of the thermo-switch 67 is urged by the return springs 69 and 70 to enter the recessed portion 63 formed in the drain pin 60 but is prevented from abutting against the fixed pin 54 with a minute gap therebetween. When the temperature at the thermo-switch 67 rises up to a predetermined level, the head pin 71 of the thermo-switch 67 is extended leftward to abut against the fixed pin 54, with the resultant reaction force causing the thermo-switch 67 to retreat rightward as seen in FIG. 5B against the return springs 69 and 70. Once the thermo-switch 67 retreats rightward, the force pressing the drain pin 60 is cut off, releasing the drain pin 60, which in turn is displaced rightward by a high pressure from the high-pressure port 57 to open the drain hole 56. For this reason, oil within the high-pressure port 57 flows as indicated by an arrow through the drain hole 56 and then drain chamber 64 into the drain passage 65. That is, as seen in FIG. 6, when the drain pin 60 opens the drain hole 56, oil within the high-pressure port 57 flows into the drain chamber 64 as indicated by the arrow, after which it is drained through the drain passage 65 into the low-pressure chamber. The drain pin 60 displaced at that time comes into abutment against the fixed pin 54 and is prevented from being further displaced. In this manner, the thermo-switch 67 is displaceably arranged within the low-pressure chamber 66 so as to prevent a high pressure from acting on the thermo-switch 67, so that its strength and durability can be improved. Furthermore, there is no need to insert the head pin of the thermo-switch into the drain hole 56, with the result that the diameter of the drain hole 56 can be reduced allowing a hydraulic pressure at high pressure side to be set to a high level. In addition, there is no need for any specific members for completely fixing the thermo-switch 67, whereby it is possible to achieve a size reduction while keeping the same performance.

It will be appreciated that the present invention is not limited to the above embodiment and that it includes any appropriate variants insofar as they do not impair the objects and advantages thereof. The present invention is not intended to be restricted by the numerical values shown in the above embodiment.

What is claimed is:

1. A drain mechanism for a hydraulic power transmission joint adapted to be interposed between an input shaft and an output shaft that are rotatable relative to each other, to transmit torque as a function of the rotational-speed difference between said input and output shafts, said drain mechanism comprising:

a drain plug accommodated within a valve block and having a drain hole through which oil is introduced from a high-pressure chamber;

a thermo-switch located within a low-pressure chamber in said valve block in such a manner as to be urged by a return spring, said thermo-switch having a head pin that protrudes when a predetermined temperature is reached;

a fixed pin fixedly inserted into said valve block, said fixed pin being positioned so as to allow a head pin of said thermo-switch urged by said return spring to abut thereagainst, said fixed pin when said head pin protrudes at said predetermined temperature causing said thermo-switch to retreat against said return spring; and a drain pin slidably located within said drain plug, said drain pin being pressed by said thermo-switch to close said drain hole for the duration in which said predetermined temperature is not reached, said drain pin when said predetermined temperature is reached, opening said drain hole as a result of cutoff of the pressing force caused by a retreat of said thermo-switch.

2. A drain mechanism according to claim 1, wherein said drain pin has a recessed portion which is formed at its rear end side and which is open rearward, said recessed portion receiving said fixed pin that extends therethrough, with said head pin of said thermo-switch being inserted into said recessed portion so as to allow said head pin to abut against said fixed pin.

3. A drain mechanism according to claim 1, wherein said hydraulic power transmission joint comprises:

a housing coupled to said input shaft and having a cam face formed on its inner side surface;

a rotor coupled to said output shaft and being rotatably accommodated in said housing, said rotor having a plurality of axially extending plunger chambers;

a plurality of plungers each being reciprocatively accommodated in each of said plurality of plunger chambers under a biasing force of said return spring, said plurality of plungers being operated by said cam face upon the relative rotations of said input and output shafts; and a discharge hole formed in said rotor and opening to said plurality of plunger chambers; wherein said valve block is coupled to said rotor so that oil discharged by the operation of said plungers induces a reaction force in said plungers due to a flow resistance upon passage through an orifice provided in said valve block, to thereby transmit torque between said housing and said rotor.

* * * * *